(12) United States Patent
Ikeda et al.

(10) Patent No.: US 8,765,289 B2
(45) Date of Patent: Jul. 1, 2014

(54) POWER SUPPLY UNIT WITH BUS BAR MODULE

(75) Inventors: Tomohiro Ikeda, Shizuoka (JP); Takao Shoji, Shizuoka (JP); Shinichi Yanagihara, Shizuoka (JP); Hideki Inoue, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 864 days.

(21) Appl. No.: 12/458,802

(22) Filed: Jul. 23, 2009

(65) Prior Publication Data
US 2010/0055993 A1 Mar. 4, 2010

(30) Foreign Application Priority Data

Aug. 27, 2008 (JP) ................................. 2008-218429

(51) Int. Cl.
*H01M 2/24* (2006.01)
*H01M 2/10* (2006.01)
*H01M 2/20* (2006.01)
*H01R 11/28* (2006.01)

(52) U.S. Cl.
CPC ............ *H01M 2/1077* (2013.01); *H01M 2/206* (2013.01); *H01R 11/286* (2013.01)
USPC ............ 429/160; 429/158; 429/149; 439/756

(58) Field of Classification Search
USPC ............... 429/149, 156, 158, 160, 7, 121, 97; 439/754, 756, 757, 772
See application file for complete search history.

(56) References Cited

U.S. PATENT DOCUMENTS

| | | | |
|---|---|---|---|
| 2003/0181106 A1* | 9/2003 | Schell et al. | 439/825 |
| 2005/0242917 A1* | 11/2005 | Higuchi et al. | 337/180 |
| 2006/0040173 A1* | 2/2006 | Shimamura et al. | 429/99 |
| 2009/0075163 A1* | 3/2009 | Shevock et al. | 429/121 |
| 2011/0269001 A1* | 11/2011 | Onuki et al. | 429/71 |

FOREIGN PATENT DOCUMENTS

JP 2004-031049 A 1/2004

* cited by examiner

*Primary Examiner* — Raymond Alejandro
(74) *Attorney, Agent, or Firm* — Edwards Wildman Palmer LLP (57) ABSTRACT

A power supply unit includes: a plurality of batteries each of which has a positive electrode 8 at one end and a negative electrode at the other end; and a bus bar module connecting the batteries in series. The bus bar module includes: a plurality of bus bars each having a pair of connecting parts respectively connected to the electrodes adjacent to each other of the batteries adjacent to each other, and a coupling part coupling the pair of connecting parts to each other; a plurality of terminals each elastically clamping the electrodes and the connecting parts to electrically connect the electrodes to the connecting parts; and a plate to which the bus bars and the terminals are attached. The electrodes are formed in a flat plate shape, and thickness directions of the electrodes which are connected to each other by the bus bar are perpendicular to each other.

8 Claims, 12 Drawing Sheets

POWER SUPPLY UNIT WITH BUS BAR MODULE

CROSS REFERENCE TO RELATED APPLICATIONS

This application is on the basis of Japanese Patent Application No. 2008-218429, the contents of which are hereby incorporated by reference.

BACKGROUND OF THE INVENTION

1. Field of the Invention

The present invention relates to a power supply unit used for a hybrid vehicle or an electric vehicle.

2. Description of the Related Art

Figure 13:
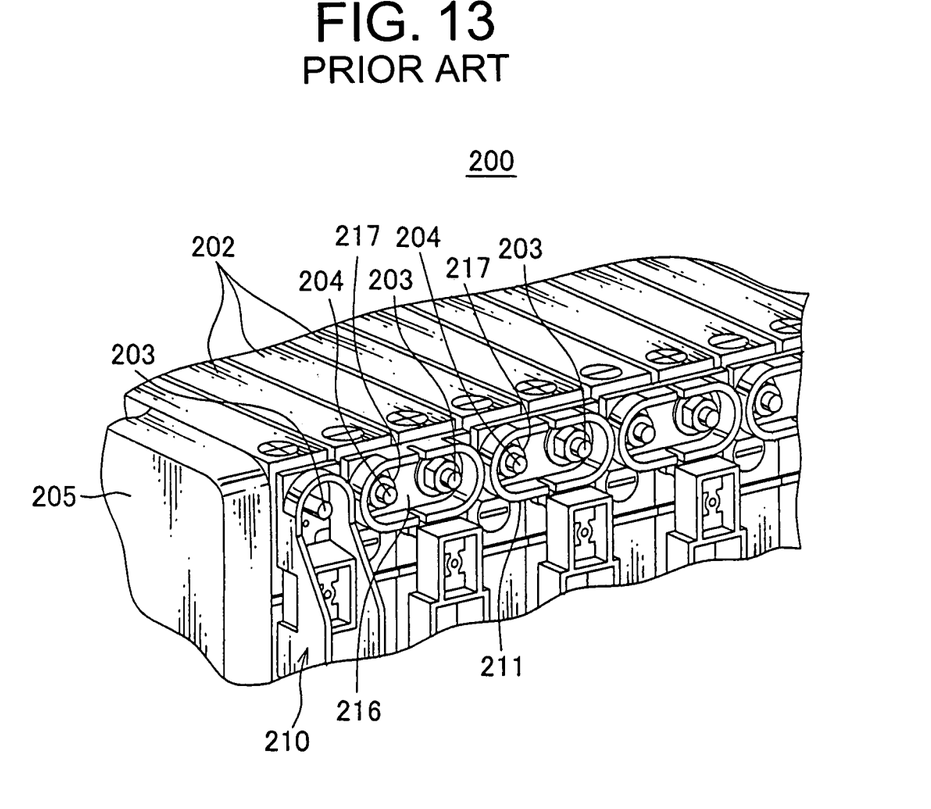
FIG. 13 is a perspective view showing a conventional power supply unit.

For example, in an electric vehicle driving with an electric motor, or a hybrid vehicle moving with an engine and the electric motor, a power supply unit 200 (for example, see Patent Document 1) as shown in FIG. 13 is mounted as a driving source of the electric motor.

The power supply unit 200 shown in FIG. 13 includes: a plurality of batteries 202 each having a positive electrode 203 at one side and a negative electrode 204 at the other side; and a pair of end plates 205 (only one of the end plates is shown) clamping the batteries 202 therebetween; and a bus bar module 210 connecting the batteries 202 in series.

The batteries 202 are arranged in a line so that the positive electrode 203 and the negative electrode 204 of the batteries adjacent to each other are adjacent to each other. Further, each of the electrodes 203, 204 is formed in a male screw shape for allowing a nut 217 shown in FIG. 13 to be screwed therewith.

The bus bar module 210 includes: a plurality of bus bars each electrically connecting the positive electrode 203 and the negative electrode 204 of the batteries adjacent to each other; a plurality of nuts fixing the bus bars 216 with the electrodes 203, 204; and a plate 211 made of synthetic resin for positioning the bus bars 216 in predetermined positions. Further, the bus bar 216 is made of a flat metal plate having a pair of through holes. The positive electrode 203 and the negative electrode 204 of the batteries adjacent to each other are inserted into the pair of through holes.

When assembling the power supply unit 200, firstly, the batteries 202 are arranged in a line, then, the pair of end plates 205 clamps the batteries, and a not-shown band or the like fixes the batteries 202 with the pair of end plates. Then, the plate 211 and the bus bars 216 are overlapped with the electrodes 203, 204 of the batteries 202. In this case, the electrodes 203, 204 are respectively inserted into the pair of through holes of the bus bar 216. Then, the nuts 217 are screwed with the electrodes 203, 204 penetrating the through holes to fix the bus bar 216 to the electrodes 203, 204. Namely, the bus bar 216 is electrically connected to the electrodes 203, 204. Thus, the power supply unit 200 is assembled.

[Patent Document 1] Japanese Published Patent Application No. 2004-31049

However, in the conventional power supply unit 200, the bus bar 216 is fixed to the electrodes 203, 204 by screwing the nuts 217 with the electrodes 203, 204 penetrating the through holes of the bus bar 216. Therefore, there is a problem that the number of screwing positions of the nuts 207 and the electrodes 203, 204 is large, and an assembling man-hour is increased.

Accordingly, an object of the present invention is to provide a power supply unit which can be assembled with a reduced assembling man-hour.

SUMMARY OF THE INVENTION

In order to attain the object, according to the present invention, there is provided a power supply unit including: a plurality of batteries each of which has a positive electrode at one end and a negative electrode at the other end; and a bus bar module connecting the batteries in series, wherein the bus bar module includes: a plurality of bus bars each having a pair of connecting parts respectively connected to the electrodes adjacent to each other of the batteries adjacent to each other, and a coupling part coupling the pair of connecting parts to each other; a plurality of clamping members for clamping the electrodes and the connecting parts to electrically connect the electrodes to the connecting parts; and a plate to which the bus bars and the clamping members are attached.

Preferably, the clamping member is a clip to elastically clamp the electrodes and the connecting parts in such a manner that the electrodes and the connecting parts are overlapped with each other.

Preferably, the clamping member is a conductive terminal having a tubular part receiving the electrodes and the connecting parts, and a pressing member for pressing the electrodes and the connecting parts toward an inner surface of the tubular part.

Preferably, the bus bar module is connectable to electric wires connected to a voltage measuring circuit for measuring voltages of the batteries, and further includes an electric wire connecting member integrally formed with the clamping member.

Preferably, the bus bar module is connectable to electric wires connected to a voltage measuring circuit for measuring voltages of the batteries, and further includes an electric wire connecting member to be clamped by the clamping member together with the electrodes and the connecting parts.

Preferably, the electrodes are formed in a flat plate shape, and thickness directions of the electrodes which are connected to each other by the bus bar are perpendicular to each other.

These and other objects, features, and advantages of the present invention will become more apparent upon reading of the following detailed description along with the accompanied drawings.

DETAILED DESCRIPTION OF THE PREFERRED EMBODIMENTS

First Embodiment

A power supply unit according to a first embodiment of the present invention will be explained with reference to FIGS. 1 to 7.

Figure 1:
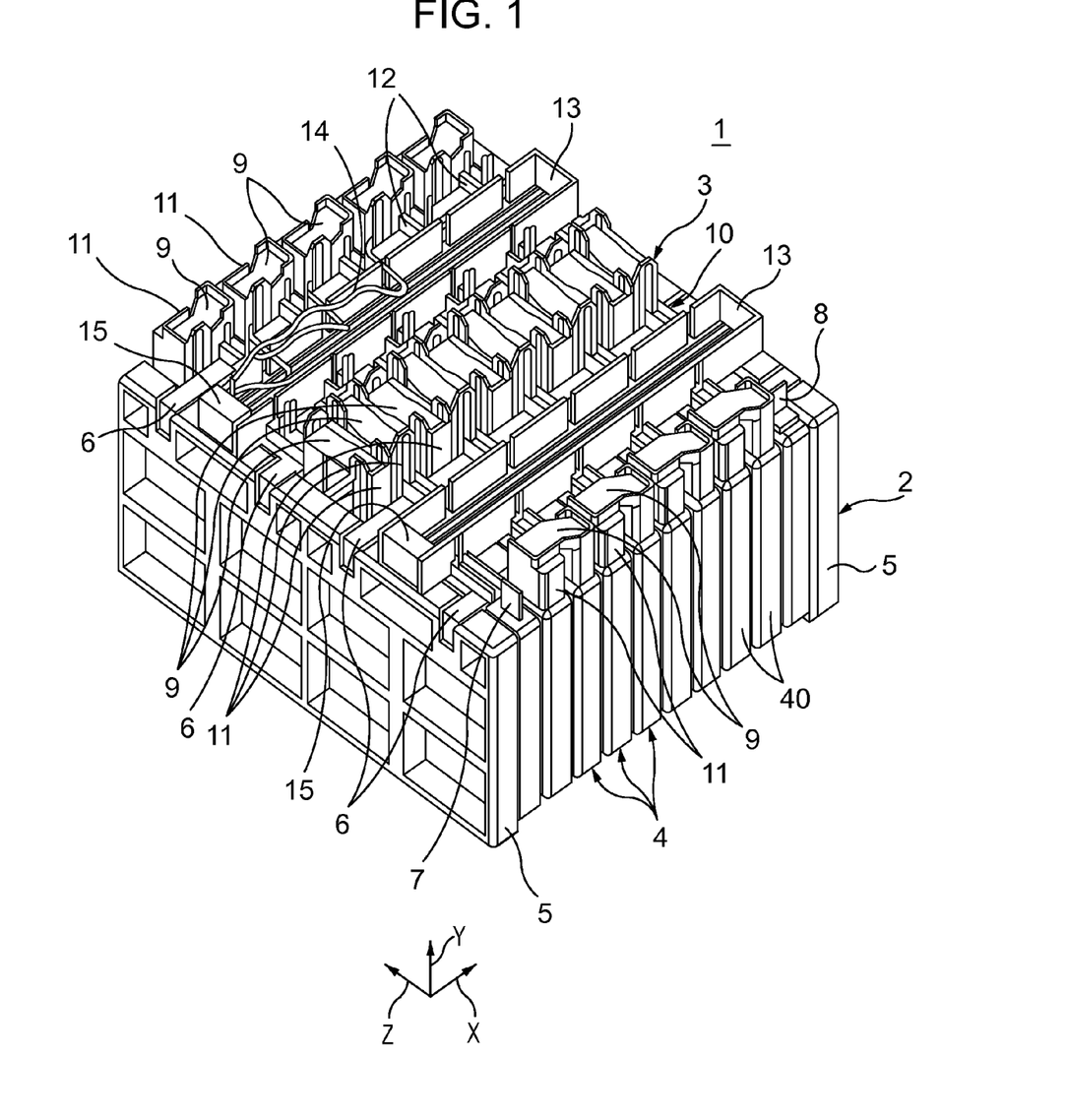
FIG. 1 is a perspective view showing a power supply unit according to a first embodiment of the present invention.

A power supply unit 1 shown in FIG. 1 is mounted on such as an electric vehicle driving with an electric motor, or a hybrid vehicle moving with an engine and the electric motor, and supplies electric power to the electric motor. This power supply unit 1 includes: a battery assembly 2; and a bus bar module 3.

The battery assembly 2 includes: a plurality of batteries 4 arranged in two lines; a pair of end plates 5 sandwiching the batteries 4 arranged in two lines therebetween; a plurality of band-shaped band members 6 attaching to both end plates 5 for fastening the pair of end plates 5 and the batteries 4 arranged in two lines. In FIG. 1, an arrow X indicates an arranging direction of the batteries 4 in each line, and a thickness direction of each battery 4. An arrow Z indicates an arranging direction of the two lines of the batteries 4, and a width direction of each battery 4. An arrow Y indicates a height direction of each battery 4.

Figure 3:
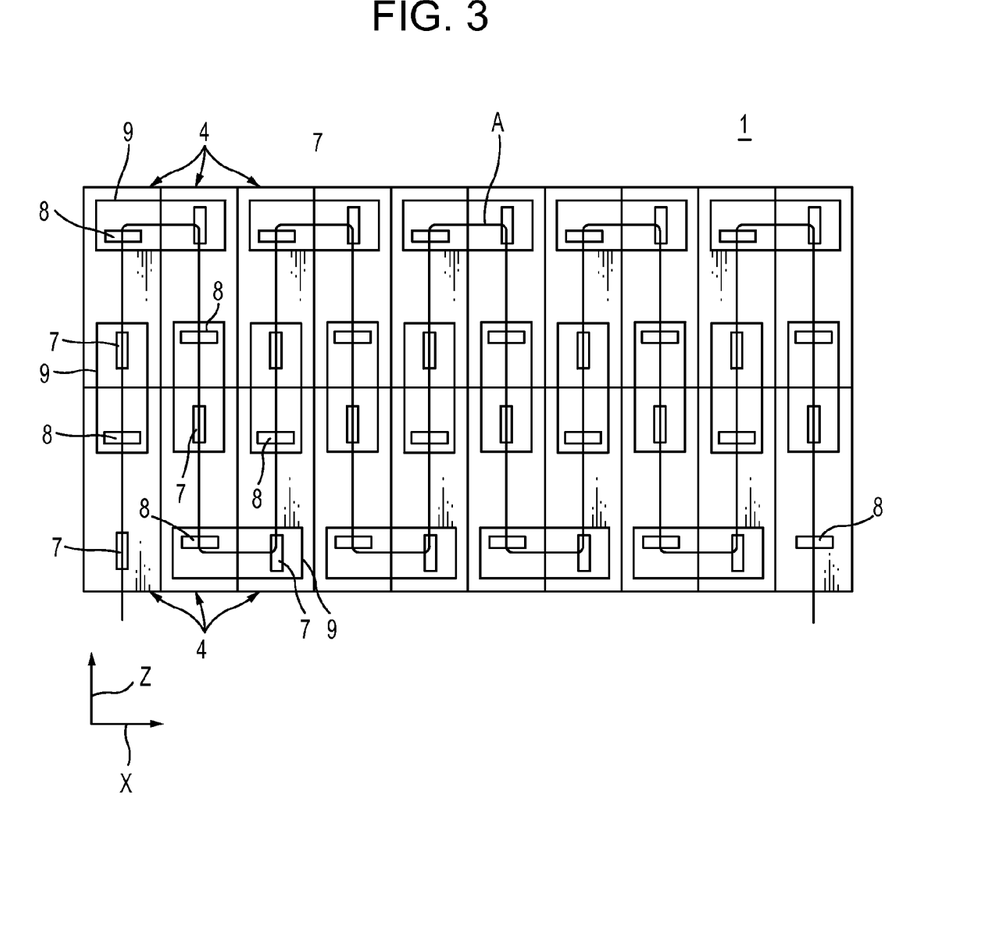
FIG. 3 is a schematic view showing a connecting order of a plurality of batteries of the power supply unit shown in FIG. 1.

Further, each battery 4 includes: a box-shaped battery main body 40; and a pair of electrodes 7, 8 projected from an upper wall 40a of the battery main body 40. The upper wall 40a is a flat plane positioned at one end in the arrow Y direction. Further, the pair of electrodes are arranged in the arrow Z direction, and projected in the arrow Y direction. The electrode 7 is a negative electrode, and the electrode 8 is a positive electrode. Further, as shown in FIG. 3, that the positive electrode 8 and the negative electrodes of the batteries 4 adjacent to each other are arranged adjacent to each other. Incidentally, an alternate long and short dash line in FIG. 3 indicates an electric current direction.

The electrodes 7, 8 are made of conductive metal, and formed in a flat plate shape. Further, thickness directions of the electrodes 7, 8 are perpendicular to each other.

Figure 2:
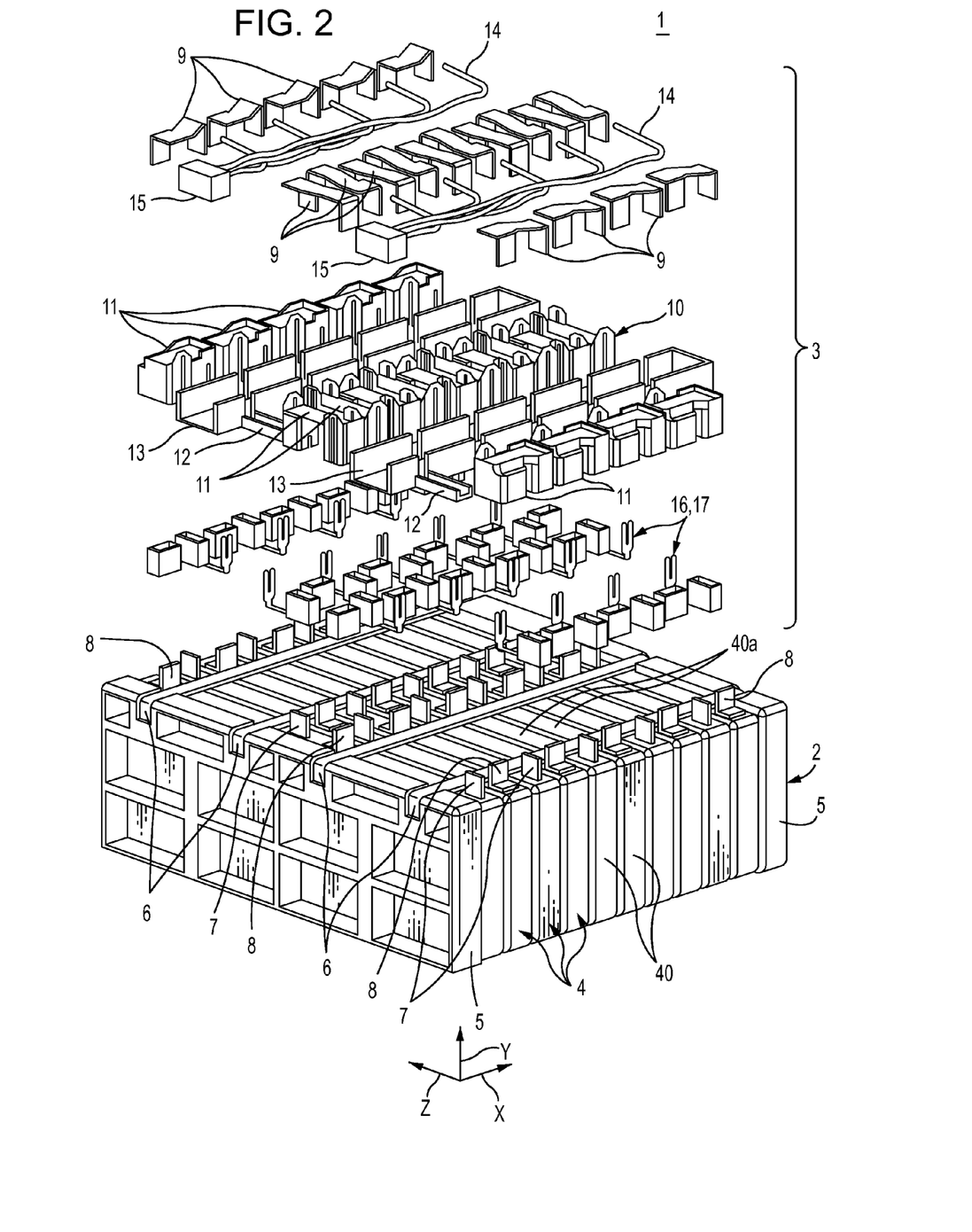
FIG. 2 is an exploded view of the power supply unit shown in FIG. 1.

The bus bar module 3 connects the batteries 4 in series. As shown in FIG. 2, the bus bar module 3 includes: a plurality of bus bars 9; a plurality of terminals 16, 17 as clamping members; electric wire connecting parts 19 integrally formed with the terminals 16; a plate 10 made of synthetic resin; connectors 15 connected to a voltage measuring circuit (not shown); a plurality of electric wires 14 each of which one end is connected to the voltage measuring circuit via the connector 15, and the other end is connected to the electric wire connecting part 19. The voltage measuring circuit measures such as a voltage of each battery 4 of the battery assembly 2, a total voltage of all the batteries 4 connected in series, or the like. The electric wire 14 is a well-known covered electric wire having a core wire and an insulating cover covering the core wire.

Figure 4:
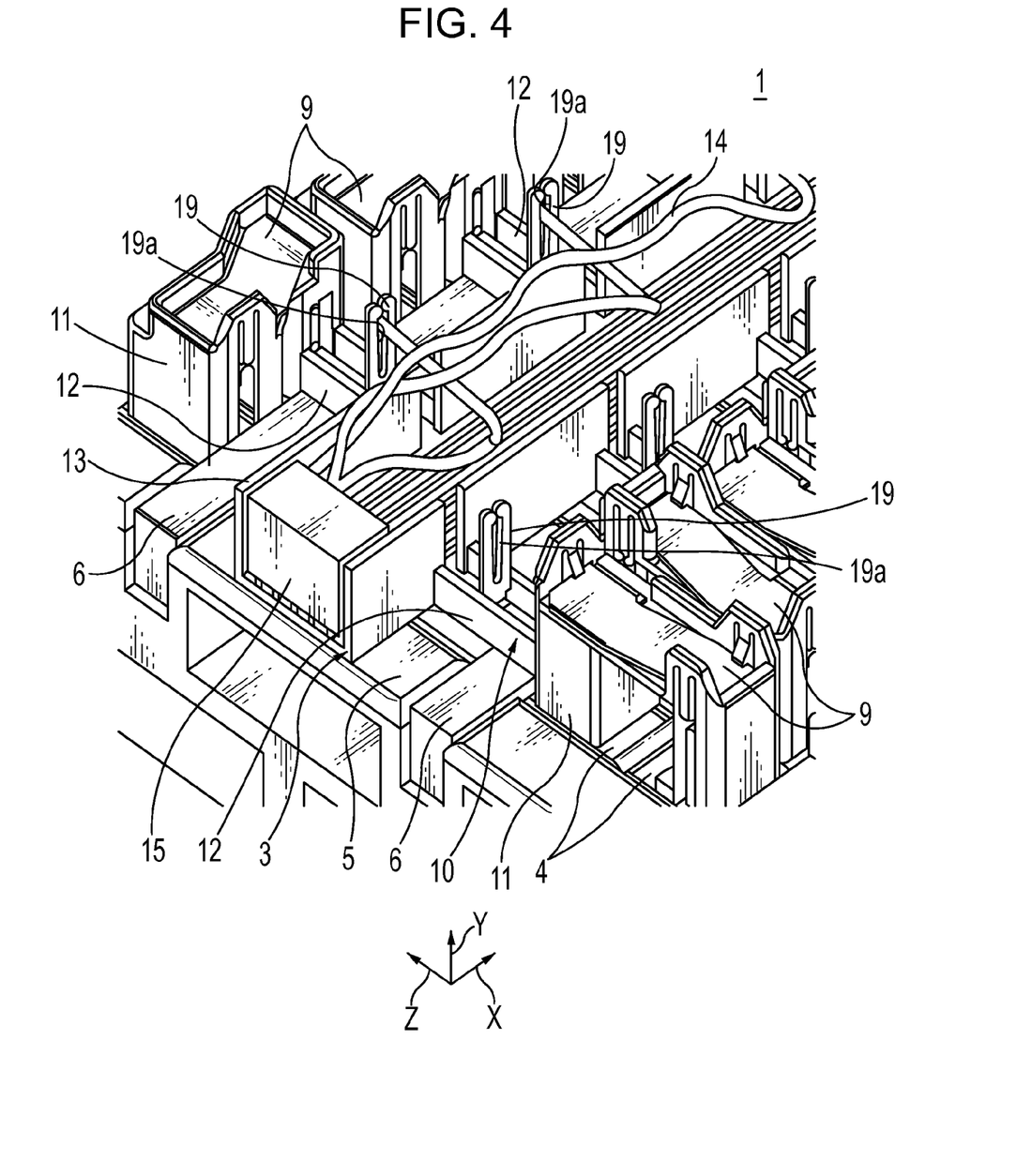
FIG. 4 is an enlarged view showing a main part of a bus bar module of the power supply unit shown in FIG. 1.
Figure 5:
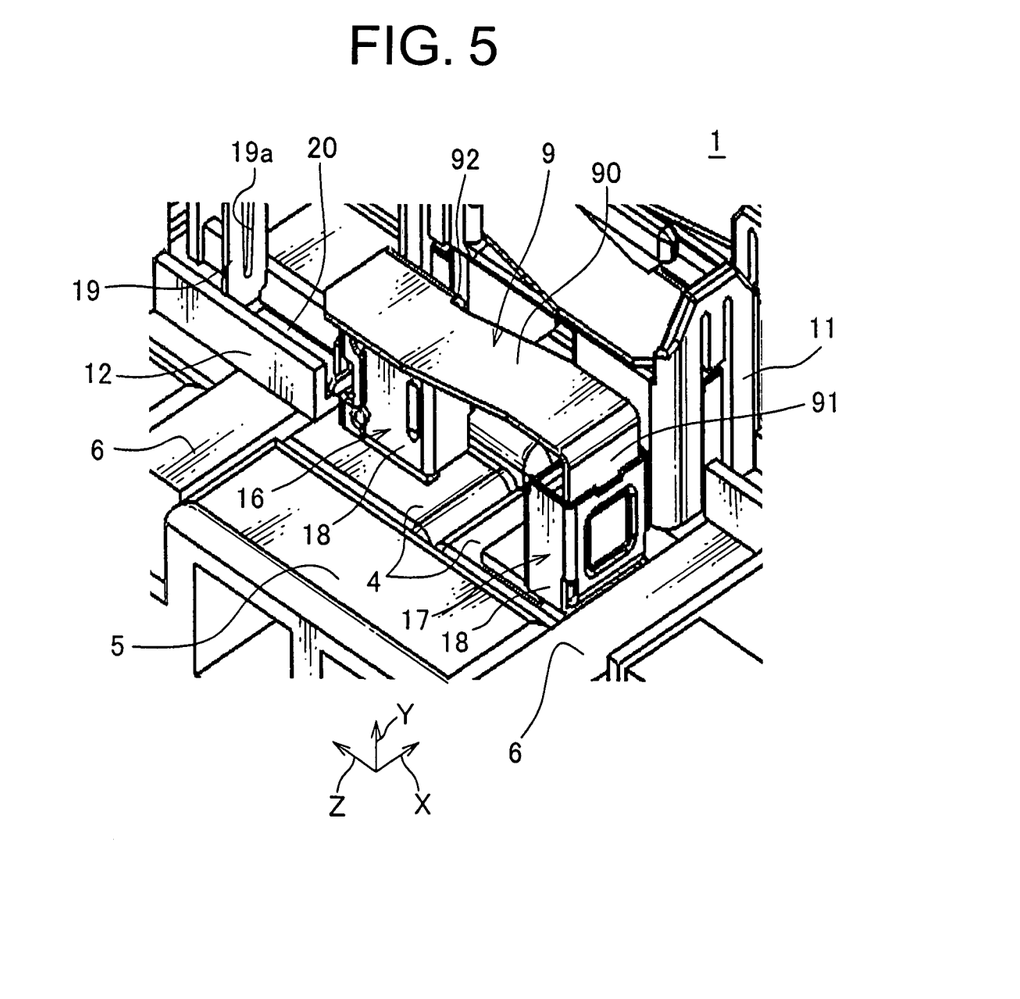
FIG. 5 is a perspective view showing the bus bar module shown in FIG. 4 in which a bus bar attaching part is partially hidden.
Figure 6:
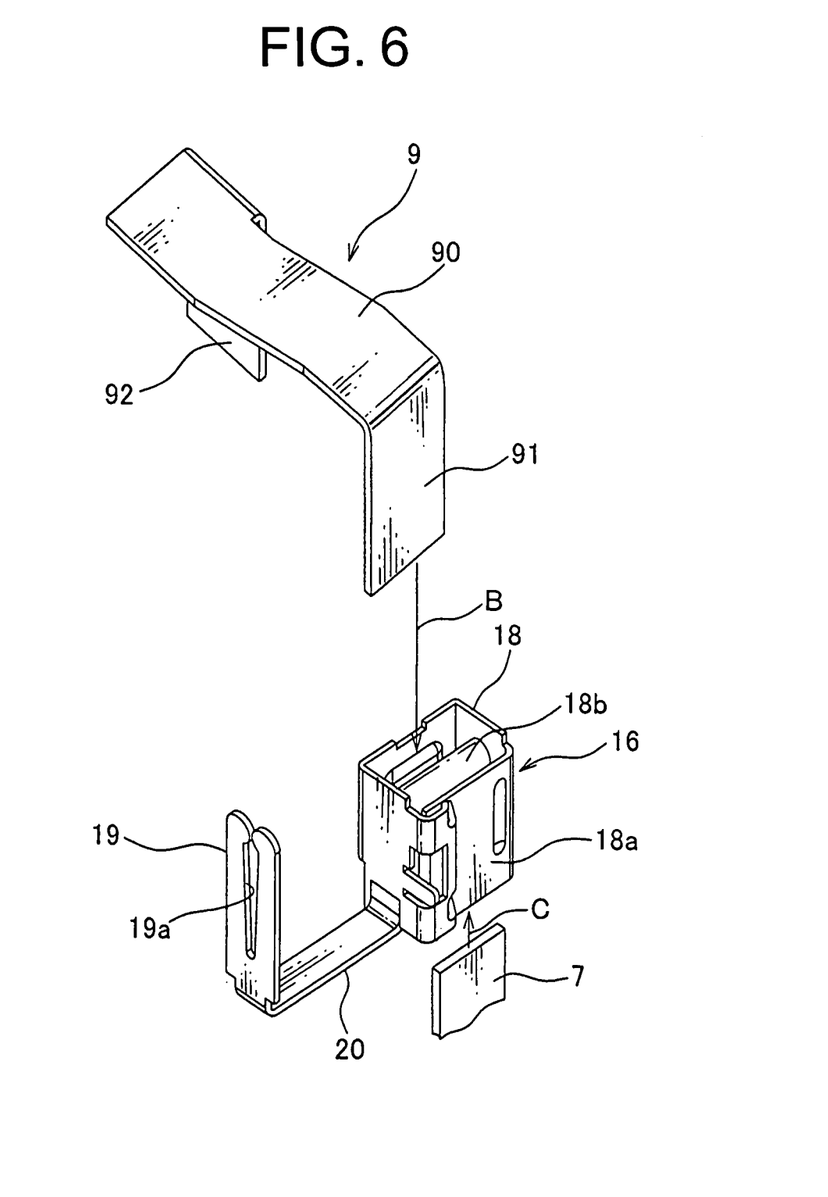
FIG. 6 is a perspective view partially showing a bus bar, a clamping member, an electric wire connecting part, and an electrode shown in FIG. 5.

The bus bar 9 is made by such as pressing a conductive metal plate. As shown in FIGS. 4 to 6, each bus bar 9 includes: a pair of flat connecting part 91, 92 to be connected respectively to the electrodes 7, 8 adjacent to each other of the batteries 4 adjacent to each other; and a flat coupling part 90 coupling the pair of connecting parts 91, 92 to each other. The pair of connecting parts 91, 92 is projected from edges of the coupling part 90. Thickness directions of connecting parts 91, 92 are perpendicular to each other.

The terminal 17 includes a clamping part 18 for clamping both the electrode 7 and the connecting part 91, or both the electrode 8 and the connecting part 92 to electrically connect the electrode 7 to the connecting part 91, or the electrode 8 to the connecting part 92. This clamping part 18 is made by such as pressing a conductive metal plate. The clamping part 18 integrally includes: a square-tubular-shaped tube member 18a for receiving both the electrode 7 and the connecting part 91, or both the electrode 8 and the connecting part 92; and a spring type pressing member 18b for pressing both the electrode 7 and the connecting part 91, or both the electrode 8 and the connecting part 92 toward an inner wall of the tube member 18a.

As shown in FIG. 6, the clamping part 18 receives the connecting part 91 or 92 via one opening of the tube member 18a in an arrow B direction, and receives the electrode 7 or 8 via the other opening of the tube member 18a in an arrow direction C. The arrow direction B is an opposite direction of the arrow direction C, and parallel to an axis direction of the tube member 18a.

As shown in FIG. 6, the terminal 16 integrally includes: the clamping part 18; the electric wire connecting part 19; and a coupling board 20 coupling the clamping part 18 and the electric wire connecting part 19.

As shown in FIGS. 4 and 6, the electric wire connecting part 19 is formed in a tuning fork shape having a slit 19*a*. When the electric wire 14 is inserted into the slit 19*a*, the electric wire connecting part 19 cuts into the insulating cover of the electric wire 14, and is electrically connected to the core wire of the electric wire 14.

Thus, the bus bar module 3 includes: the terminals 17 each only having the clamping part 18; and the terminals 16 each having the clamping part 18 and the electric wire connecting part 19.

The plate 10 integrally includes: a plurality of first attaching parts 11; a plurality of second attaching parts 12; and a plurality of third attaching parts 13. The one bus bar 9 and the pair of terminals 16, 17 each clamping the pair of connecting parts 91, 92 are attached to the first attaching part 11. The electric wire connecting part 19 and the coupling board 20 of the terminal 16 are attached to the second attaching part 12. A plurality of electric wires 14 and the connector 15 are attached to the third attaching part 13.

The power supply unit 1 is assembled in a manner that firstly the battery assembly 2 and the bus bar module 3 are separately assembled. Then, the assembled bus bar module 3 is overlapped with an upper wall of the assembled battery assembly 2 disposed at one end in the arrow Y direction.

Further, when the bus bar module 3 is assembled, firstly, the pair of terminals 16, 17 is attached to the first attaching part 11 of the plate 10, and the electric wire connecting part 19 and the coupling board 20 are attached to the second attaching part 19. Then, the pair of connecting part 91, 92 of the bus bar 9 is inserted into the clamping parts 18 of the pair of terminals 16, 17 to attach the bus bar 9 to the first attaching part 11. Then, the connector 15 and the electric wires 14 are attached to the third attaching part 13, and electric wires 14 are inserted into the slits 19*a* of the electric wire connecting parts 19 to electrically connect the electric wires 14 to the electric wire connecting parts 19. Thus, the bus bar module 3 is assembled.

Further, by overlapping the assembled bus bar module 3 with the top wall of the battery assembly 2, the electrodes 7, 8 are inserted into the clamping parts 18, and the clamping parts 18 clamp the electrodes 7, 8 and the connecting parts 91, 92 to electrically connect the electrodes 7, 8 to the connecting parts 91, 92. Thus, the batteries 4 are electrically connected to the bus bars 9, and the batteries 4 are connected in series.

According to the above, when the assembled bus bar module 3 is overlapped with the bus bar module 3, the connecting parts 91, 92 of the bus bars 9 and the electrodes 7, 8 of the batteries 4 are inserted into the clamping parts 18 of the terminals 16, 17 all together. Namely, the connecting parts 91, 92 of the bus bars 9 and the electrodes 7, 8 of the batteries 4 can be electrically connected to each other all together. Therefore, an assembling man-hour of the power supply unit 1 is reduced.

Further, according to the present invention, because the terminal 16 integrally includes the electric wire connecting part 19, by attaching the terminal 16 to the plate 10, the electric wire connecting part 19 is attached to the plate 10. Therefore, the assembling man-hour of the power supply unit 1 is further reduced, and the number of parts of the power supply unit 1 is reduced.

Further, according to the present invention, because the electric wire connecting part 19 is formed in a tuning fork shape, by inserting the electric wire 14 into the slit 19*a*, the electric wire 14 is easily electrically connected to the electric wire connecting part 19. Further, this insertion operation can be automated.

Further, according to the present invention, even when the electrodes 7, 8 are displaced, the pressing member 18*b* is elastically deformed to absorb the displacements of the electrodes 7, 8.

Figure 7A:
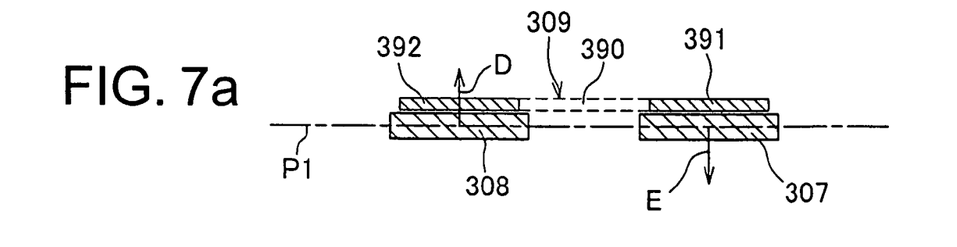
FIG. 7a is an explanatory view showing that a pair of electrodes arranged in parallel in a width direction thereof is positioned at a normal position.
Figure 7B:
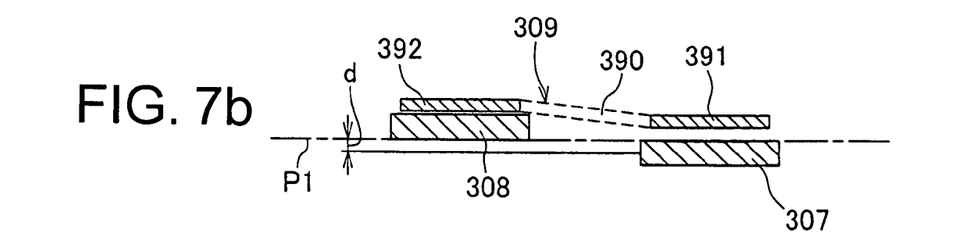
FIG. 7b is an explanatory view showing that the electrodes in FIG. 7a are respectively displaced and positioned at a farthest position from the normal position.

Incidentally, as shown in the explanatory views of FIGS. 7*a* and 7*b*, flat-plate-shaped electrodes 308, 307 are easily dislocated in their thickness direction. A reference numeral 309 shown in the explanatory views of FIGS. 7*a* and 7*b* denotes a bus bar as a reference example having a pair of connecting parts 392, 391 for respectively connecting the electrodes 308, 307 adjacent to each other, and a coupling part 390 for coupling the pair of connecting parts 392, 391 to each other. An alternate long and short dash line P1 denotes a center line passing through the center in the thickness direction of the electrodes 308, 307 when the electrodes 308, 309 are positioned at a normal position.

In the explanatory view of FIG. 7*a*, for example, when the electrode 308 is displaced in an arrow D direction, and the electrode 307 is displaced in an arrow E direction which is a reverse direction of the arrow D direction, a maximum gap d is generated in between the electrodes 308, 307 as shown in FIG. 7*b*. In a case that the maximum gap d is generated, even when the terminals 16, 17 of the present invention is used, the terminals 16, 17 may not clamp the electrodes 308, 309. Further, the bus bar 309 can be elastically deformed, however, when the maximum gap d is generated, the connecting part 391 may not be overlapped with the electrode 307, and the bus bar 309 may not be electrically connected to the electrode 307.

Figure 7C:
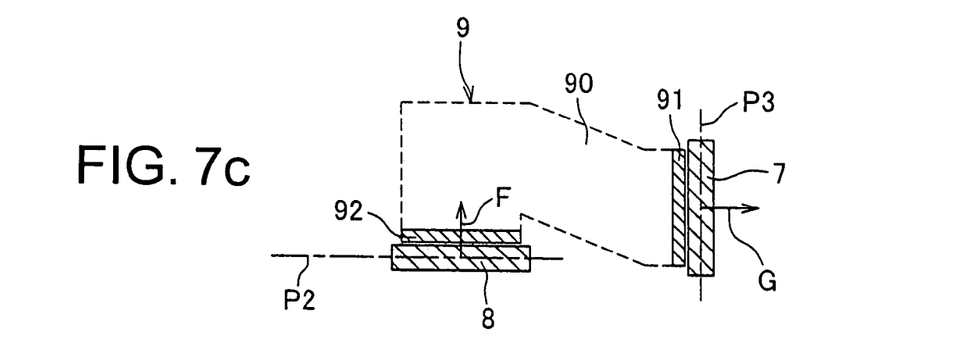
FIG. 7c is an explanatory view showing that a pair of electrodes to be connected by the bus bar of the present invention is positioned at the normal position.
Figure 7D:
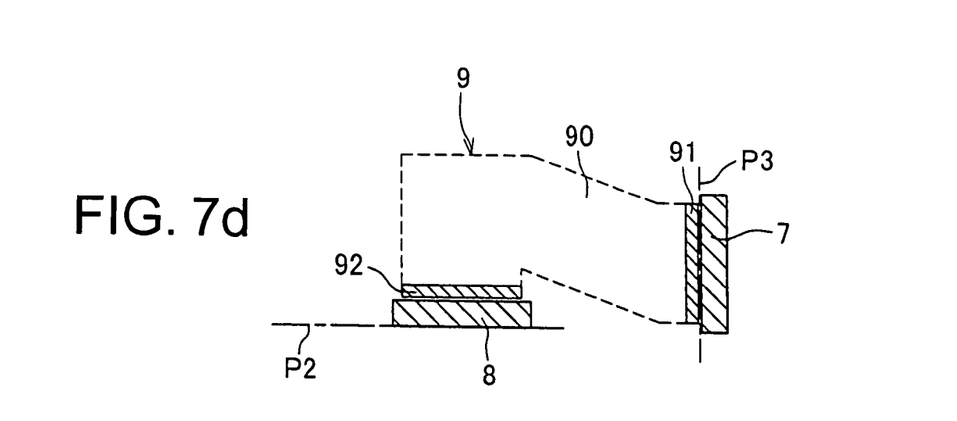
FIG. 7d is an explanatory view showing that the electrodes in FIG. 7c are respectively displaced within a tolerance range.

In this point, according to the present invention, as shown in the explanatory views of FIGS. 7*c* and 7*d*, thickness directions of the flat-plate-shaped electrodes 7, 8 are arranged perpendicular to each other. Therefore, as shown in FIGS. 7*c* and 7*d*, a displacement gap in between the electrodes 7, 8 can be reduced. An alternate long and short dash line P2 shown in FIGS. 7*c*, 7*d* denotes a center line passing through the center in the thickness direction of the electrode 8 when the electrode 8 is positioned at a normal position. An alternate long and short dash line P3 denotes a center line passing through the center in the thickness direction of the electrode 7 when the electrode 7 is positioned at a normal position.

According to the present invention, for example, when the electrode 8 is displaced in an arrow F direction shown in FIG. 7*c*, and the electrode 7 is displaced in an arrow G direction which is perpendicular to the arrow F direction, a displacement gap between the electrodes 7, 8 in the arrow F direction is mainly caused by the electrode 8, and is not affected by the electrode 7. Similarly, a displacement gap between the electrodes 7, 8 in the arrow G direction is mainly caused by the electrode 7, and is not affected by the electrode 8. Resultingly, the terminals 16, 17 can clamp the electrodes 8, 7 which are displaced.

Second Embodiment

Figure 8:
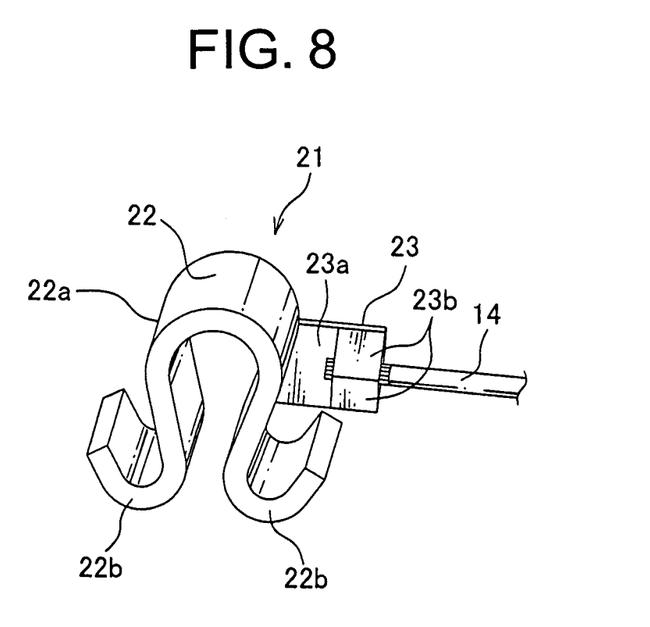
FIG. 8 is a perspective view showing the clamping member and the wire connecting part of the power supply unit according to a second embodiment of the present invention.
Figure 9A:
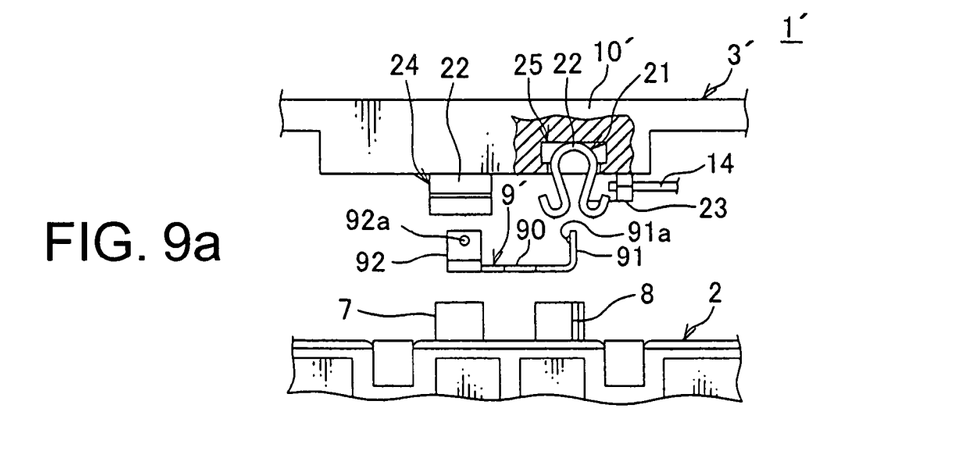
FIG. 9a is an explanatory view showing that the electrodes, a connecting part, and the clamping members are separated from each other according to the second embodiment of the present invention.
Figure 9B:
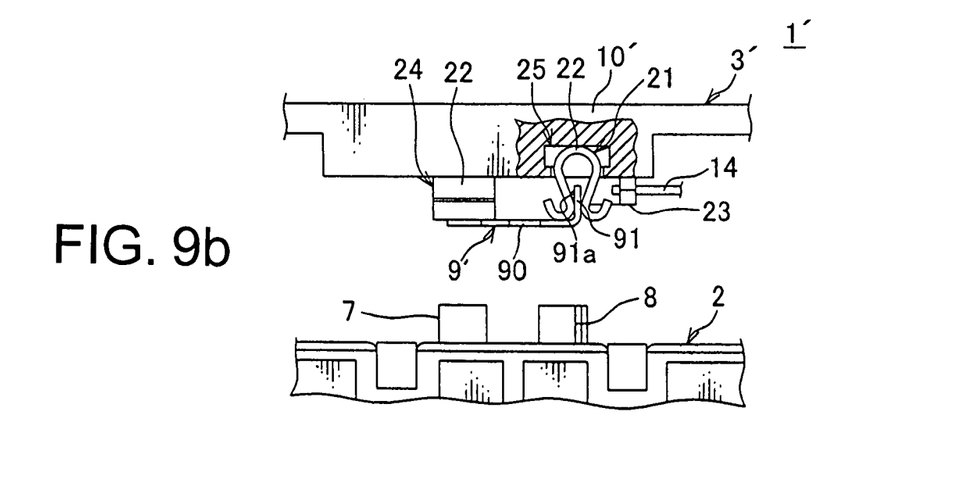
FIG. 9b is an explanatory view showing that the connecting part shown in FIG. 9a is clamped by the clamping members according to the second embodiment of the present invention.
Figure 9C:
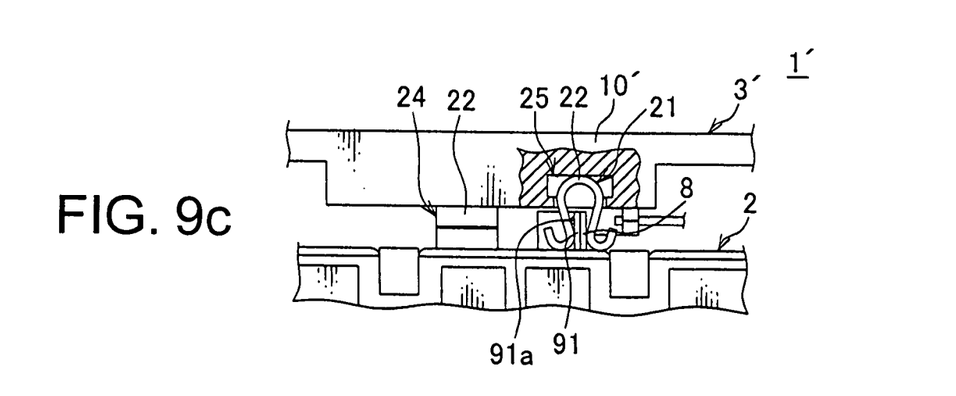
FIG. 9c is an explanatory view showing that the electrodes and the connecting part shown in FIG. 9b are overlapped with each other and clamped by the clamping members according to the second embodiment of the present invention.

Next, a power supply unit according to a second embodiment of the present invention will be explained with reference to FIGS. 8 and 9. In FIGS. 8 and 9, the same components as the first embodiment are denoted by the same reference numerals, and their descriptions are omitted.

The power supply unit 1' according to the second embodiment includes: a battery assembly 2'; and a bus bar module 3' (See FIG. 9). This bus bar module 3' includes: a plurality of bus bars 9'; a plurality of clips 21, 24 as cramping members; electric wire connecting parts 23 integrally formed with the clips 21; a synthetic resin made plate 10'; a not-shown connector; and a plurality of electric wires 14 each of which one end is connected to the voltage measuring circuit via the connector, and the other end is connected to the electric wire connecting part 23.

The bus bar 9' has the same configuration as the bus bar 9 other than that projection parts 91*a*, 92*a* are respectively formed on the pair of connecting parts 91, 92. The projection parts 91*a*, 92*a* are hemispherically-shaped projections formed by embossing the connecting parts 91, 92. Owing to the projection parts 91*a*, 92*a*, the connecting parts 91, 92 cramped by the clips 21, 24 are not easily released from the clips 21, 24.

The clip 21 is made by pressing a conductive metal plate. As shown in FIG. 8, the clip 21 integrally includes: a clip main body 22 for electrically connecting the electrode 7 or 8 to the connecting part 91 or 92 by cramping both the electrode 7 or 8 and the connecting part 91 or 92; and the electric wire connecting part 23.

The clip main body 22 includes: a C-shaped part 22*a*; and a pair of reflexed part 22*b* respectively extending from both ends of the C-shaped part 22*a*, and reflexed in a direction away from each other. The C-shaped part 22*a* can be elastically deformed from a state that a gap between both ends is smaller than a thickness of the connecting part 91 or 92 to a state that the gap is equal to a sum of the thickness of the connecting part 91 or 92 and a thickness of the electrode 7 or 8. Thus, both ends of the C-shaped part 22*a* of the clip main body 22 elastically cramps the electrode 7 or 8 and the connecting part 91 or 92 which are overlapped with each other.

The electric wire connecting part 23 includes: a plate part 23*a* extending from the C-shaped part 22*a*; and a pair of crimping pieces 23*b* extending from both edge of the plate part 23*a* in a width direction thereof. By bending inward the crimping pieces 23*b*, the electric wire connecting part 23 crimps the core wire of the electric wire 14 which is positioned on a surface of the plate part 23*a* to electrically connect the core wire of the electric wire 14 to the electric wire connecting part 23. In this embodiment, the core wire of the electric wire 14 is exposed at an end of the electric wire 14 at which the electric wire 14 is connected to the electric wire connecting part 23.

The clip 24 only includes the clip main body 22.

The plate 10' integrally includes a plurality of attaching parts 25. The clip main bodies 22 of the clips 21, 24 are elastically deformable and attached to the attaching parts 25. When the clip main bodies 22 clamp the connecting parts 91, 92, the bus bar 9' is attached to the plate 10'.

The power supply unit 1' is assembled by firstly assembling the battery assembly 2 and the bus bar module 3' separately, then, overlapping the assembled bus bar module 3' with a top wall of the assembled battery assembly 2.

When assembling the bus bar module 3', previously, the electric wire connecting part 23 of the clip 21 is connected to the electric wire 14, then, as shown in FIG. 9*a*, the clip main bodies 22 of the clips 21, 24 are attached to the attaching parts 25. Then, as shown in FIG. 9*b*, the pair of connecting parts 91, 92 of the bus bar 9' is inserted into the clip main bodies 22 to attach the bus bar 9' to the plate 10'. Thus, the bus bar module 3' is assembled.

Further, as shown in FIG. 9*c*, when the assembled bus bar module 3' is overlapped with the top wall of the battery assembly 2, electrodes 7, 8 are inserted into the clip main bodies 22, and the clip main bodies 22 elastically clamp the electrodes 7, 8 and the connecting parts 91, 92 which are overlapped with each other to electrically connect the electrodes 7, 8 to the connecting parts 91, 92. Thus, the clip main bodies 22 of the clips 21, 24 electrically connect the electrodes 7, 8 to the connecting parts 91, 92, namely, the batteries 4 are electrically connected to the bus bars 9' and the batteries 4 are connected in series.

Thus, according to the present invention, even when the electrodes 7, 8 are displaced, the clip main body 22 is elastically deformed to absorb the displacements of the electrodes 7, 8.

Third Embodiment

Figure 10:
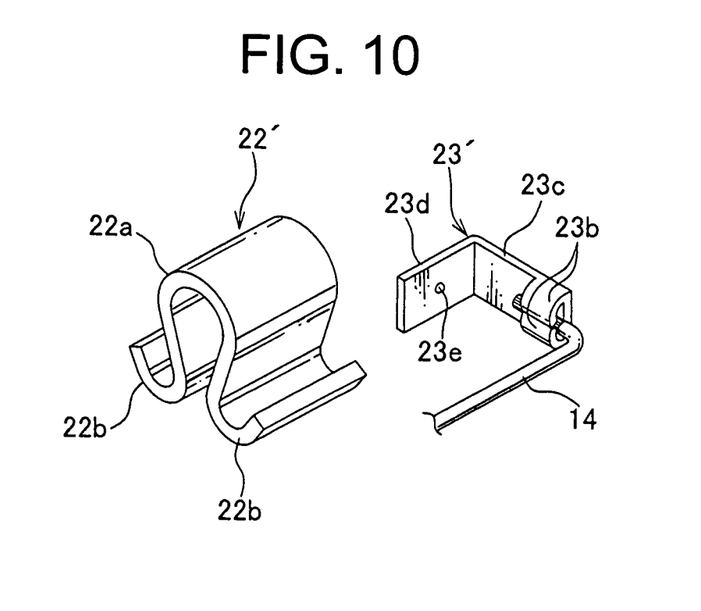
FIG. 10 is a perspective view showing the clamping member and a wire connecting member of the power supply unit according to a third embodiment of the present invention.
Figure 11:
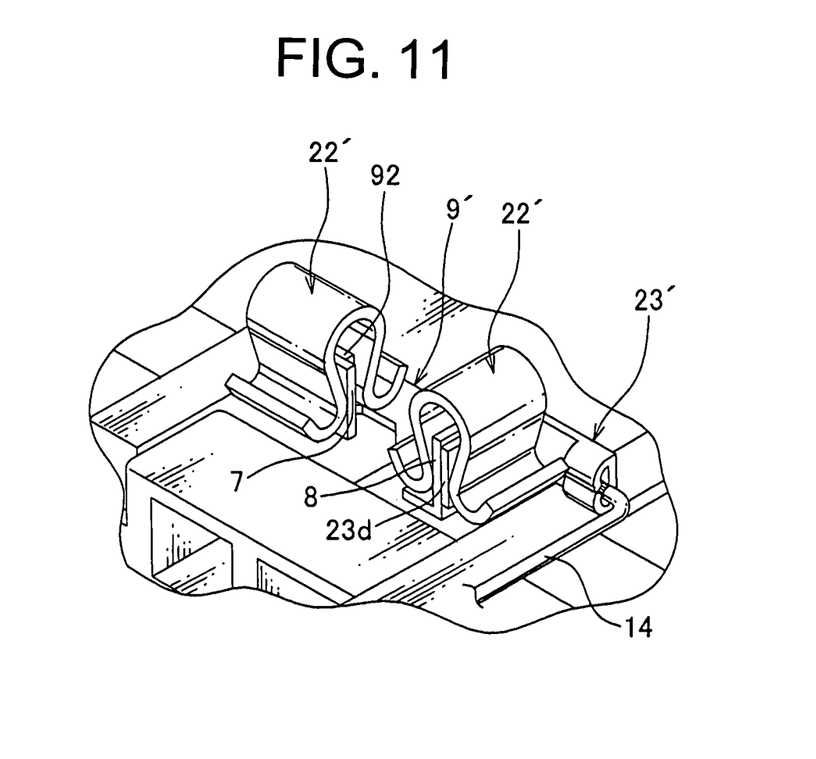
FIG. 11 is a perspective view showing that the wire connecting member shown in FIG. 10 is clamped together with both the electrode and the connecting part by the clamping member in which a plate is hidden.
Figure 12A:
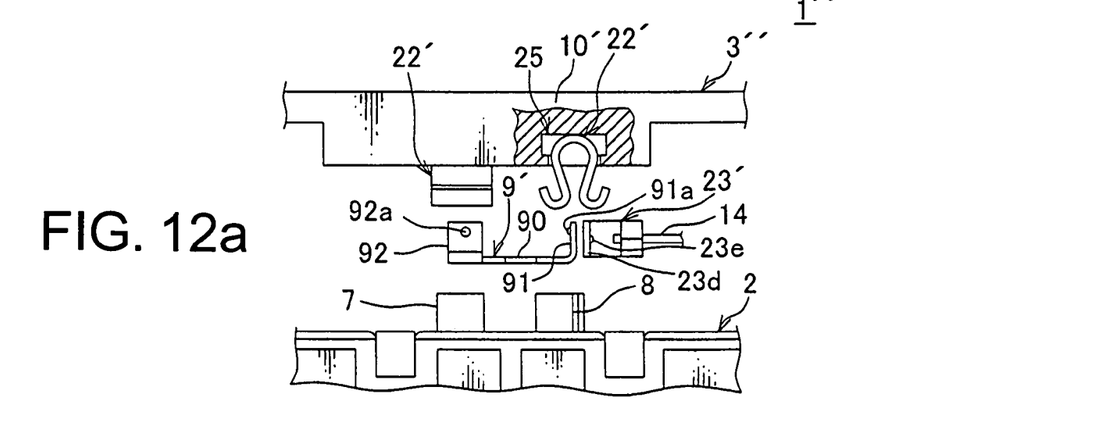
FIG. 12a is an explanatory view showing that the electrodes, a connecting part, a wire connecting member, and the clamping members are separated from each other according to the third embodiment of the present invention.
Figure 12B:
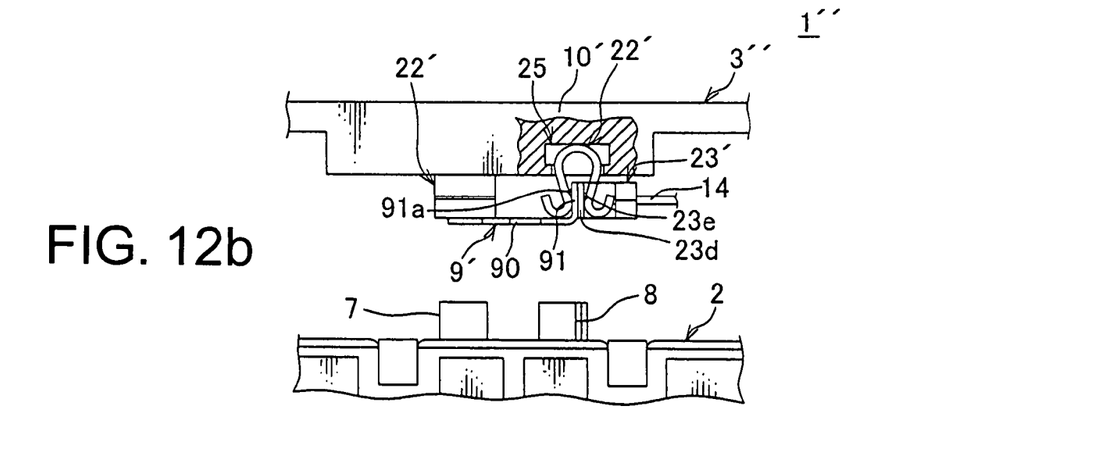
FIG. 12b is an explanatory view showing that the connecting part and the wire connecting part shown in FIG. 12a are clamped by the clamping members according to the third embodiment of the present invention.
Figure 12C:
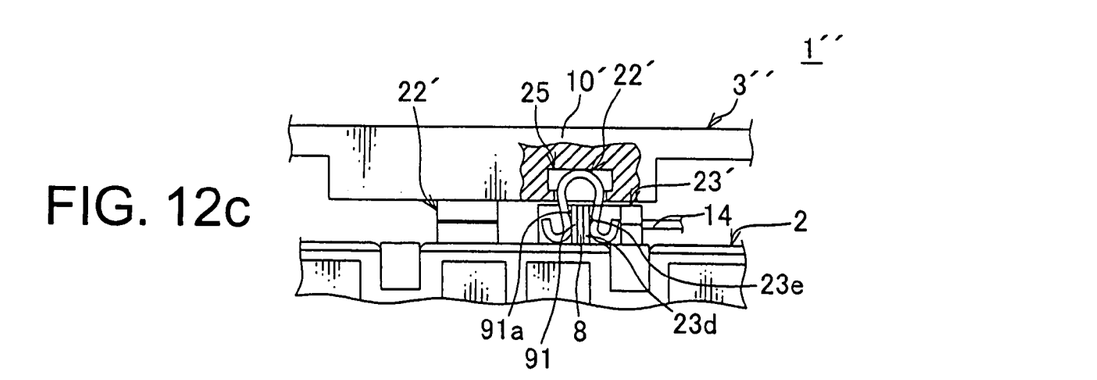
FIG. 12c is an explanatory view showing that the electrodes and the connecting part and the wire connecting part shown in FIG. 12b are overlapped with each other and clamped by the clamping members according to the third embodiment of the present invention.

Next, a power supply unit according to a third embodiment of the present invention will be explained with reference to FIGS. 10 to 12. In FIGS. 10 to 12, the same components as the first and second embodiments are denoted by the same reference numerals, and their descriptions are omitted.

A power supply unit 1" according to the third embodiment includes: a battery assembly 2; and a bus bar module 3" (see FIG. 12). This bus bar module 3" includes: a plurality of bus bars 9"; and a plurality of clips 22' as clamping members; electric wire connecting members 23'; a synthetic resin made plate 10'; a not-shown connector; and a plurality of electric wires 14 each of which one end is connected to the voltage measuring circuit via the connector, and the other end is connected to the electric wire connecting member 23'.

The clip 22' is the same configuration as the clip main body 22 described above.

As shown in FIGS. 10 and 11, the electric wire connecting member 23' includes: a plate part 23*d* which is clamped by the clip 22' together with the electrode 7 or 8 and the connecting part 91 or 92; an extending part 23*c* extending from an edge of the plate part 23*d*; and a pair of crimping pieces 23*b* extending from both edges of the extending part 23*c* in a width direction thereof. Further, a projecting part 23*e* is formed on the plate part 23*d*. This projecting part 23*e* is a hemispherically-shaped projection formed by embossing the plate part 23*d*. Owing to the projection part 23*e*, the plate part 23*d* cramped by the clip 22' is not easily released from the clip 22'.

The power supply unit 1" is assembled by firstly assembling the battery assembly 2 and the bus bar module 3" separately, then, overlapping the assembled bus bar module 3" with a top wall of the assembled battery assembly 2.

When assembling the bus bar module 3", previously, the electric wire connecting member 23' is connected to the electric wire 14, then, as shown in FIG. 12*a*, the clip 22' is attached to the attaching part 25 of the plate 10'. Then, as shown in FIG. 12*b*, the pair of connecting parts 91, 92 of the bus bar 9' is inserted into the clip 22' to attach the bus bar 9" to the plate 10'. Further, the plate part 23*d* of the electric wire connecting member 23' is inserted into the clip 22' to attach the electric wire connecting member 23' to the plate 10'. Thus, the bus bar module 3" is assembled.

Further, as shown in FIG. 12*c*, when the assembled bus bar module 3" is overlapped with the top wall of the battery assembly 2, electrodes 7, 8 are inserted into the clips 22', and the clips 22' elastically clamp the electrodes 7, 8, the connecting parts 91, 92, and the plate parts 23*d* which are overlapped with each other to electrically connect the electrodes 7, 8, the connecting parts 91, 92, and the plate parts 23*d*. Thus, the clips 22' electrically connect the electrodes 7, 8 to the connecting parts 91, 92, namely, the batteries 4 are electrically connected to the bus bars 9' and the batteries 4 are connected in series.

Thus, according to the present invention, the electric wire connecting member 23' is easily attached to the plate 10' by inserting the plate part 23*d* of the electric wire connecting member 23' into the clip 22'. Therefore, the power supply unit 1" can be assembled with a reduced assembling man-hour and with a small number of parts.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter Hdefined, they should be construed as being included therein.

What is claimed is:

1. A power supply unit comprising:
   a plurality of batteries each of which has a positive electrode at one end and a negative electrode at the other end forming a battery electrode; and
   a bus bar module connecting the batteries in series,
   the bus bar module includes:
      a plurality of bus bars each having a pair of connecting parts respectively connected to the electrodes adjacent to each other of the batteries adjacent to each other, and each having a coupling part coupling the respective pair of connecting parts to each other, with the pair of connecting parts being perpendicular to the coupling part and a thickness direction of each member of the pair of the connecting parts being perpendicular to each other;
      a plurality of clamping members for elastically clamping both the battery electrodes and busbar connecting parts to electrically connect the battery electrodes to the busbar connecting parts; and
      a plate to which the plurality of bus bars and the plurality of clamping members are attached when the plurality of bus bars are inserted into the plurality of clamping members.

2. The power supply unit as claimed in claim 1, wherein the clamping member is a clip to elastically clamp the electrodes and the connecting parts in such a manner that the electrodes and the connecting parts are overlapped with each other.

3. The power supply unit as claimed in claim 1, wherein the clamping member is a conductive terminal having a tubular part receiving the electrodes and the connecting parts, and a pressing member for pressing the electrodes and the connecting parts toward an inner surface of the tubular part.

4. The power supply unit as claimed in claim 1, wherein the bus bar module is connectable to electric wires connected to a voltage measuring circuit for measuring voltages of the batteries, and further includes an electric wire connecting member integrally formed with the clamping member.

5. The power supply unit as claimed in claim 1, wherein the bus bar module is connectable to electric wires connected to a voltage measuring circuit for measuring voltages of the batteries, and further includes an electric wire connecting member to be clamped by the clamping member together with the electrodes and the connecting parts.

6. The power supply unit as claimed in claim 1, wherein the electrodes are formed in a flat plate shape, and thickness directions of the electrodes which are connected to each other by the bus bar are perpendicular to each other.

7. A power supply unit comprising:
   a plurality of batteries each of which has a positive electrode at one end and a negative electrode at the other end forming a battery electrode; and
   a bus bar module connecting the batteries in series,
   the bus bar module includes:
      a plurality of bus bars each having a pair of connecting parts respectively connected to the electrodes adjacent to each other of the batteries adjacent to each other, and each having a coupling part coupling the respective pair of connecting parts to each other;
      a plurality of clamping members for elastically clamping both the battery electrodes and busbar connecting parts to electrically connect the battery electrodes to the busbar connecting parts; and
      a plate to which the plurality of bus bars and the plurality of clamping members are attached when the plurality of bus bars are inserted into the plurality of clamping members.
   wherein the clamping member includes a C-shaped part and a pair of reflexed parts respectively extending from both ends of the C-shaped part, and reflexed in a direction away from each other,
   wherein the power supply unit is arranged such that each of the positive electrode and negative electrode, in each bus bar module, is oriented perpendicular to the other along the length of the batteries in series such that no two adjacent battery electrodes are parallel in orientation.

8. A power supply unit comprising:
   a plurality of batteries each of which has a positive electrode at one end and a negative electrode at the other end forming a battery electrode; and
   a bus bar module connecting the batteries in series,
   the bus bar module includes:
      a plurality of bus bars each having a pair of connecting parts respectively connected to the electrodes adjacent to each other of the batteries adjacent to each other, and each having a coupling part coupling the respective pair of connecting parts to each other;
      a plurality of clamping members for elastically clamping both the battery electrodes and busbar connecting parts to electrically connect the battery electrodes to the busbar connecting parts; and
      a plate to which the plurality of bus bars and the plurality of clamping members are attached when the plurality of bus bars are inserted into the plurality of clamping members,
   wherein the clamping member includes a C-shaped part and a pair of reflexed parts respectively extending from both ends of the C-shaped part, and reflexed in a direction away from each other,
   wherein the clamping member includes a C-shaped part and a pair of reflexed parts respectively extending from both ends of the C-shaped part, and reflexed in a direction away from each other.

* * * * *